United States Patent [19]
Barbier

[11] 3,956,730
[45] May 11, 1976

[54] SEISMIC EXPLORATION

[75] Inventor: Maurice Barbier, Ousse, France

[73] Assignee: Societe Nationale des Petroles d'Aquitaine, Courbevoie, France

[22] Filed: May 14, 1974

[21] Appl. No.: 469,873

Related U.S. Application Data

[63] Continuation of Ser. No. 222,198, Jan. 31, 1972, abandoned.

[30] Foreign Application Priority Data

Feb. 2, 1971 France .............................. 71.03480

[52] U.S. Cl. ................ 340/15.5 CP; 340/15.5 CC; 340/15.5 TA
[51] Int. Cl.² ........................................... G01V 1/13
[58] Field of Search ............. 340/15.5 TA, 15.5 CP, 340/15.5 CC

[56] References Cited
UNITED STATES PATENTS

| | | | |
|---|---|---|---|
| 3,332,511 | 7/1967 | Silverman .................... | 340/15.5 TA |
| 3,523,277 | 8/1970 | Landrum, Jr. ............... | 340/15.5 TA |

*Primary Examiner*—Malcolm F. Hubler
*Assistant Examiner*—H. A. Birmiel
*Attorney, Agent, or Firm*—Brisebois & Kruger

[57] ABSTRACT

A method of seismic exploration employing a plurality of emission sources and at least one receiver, arranged in a common plane, in which the sources emit signals into the medium to be explored, which are received after reflection by the receiver, the emission times anda received signals being recorded and correlated to yield required information, and in which the relative emission times of the pulse sources is determined by a predetermined program. Apparatus for carrying out this method is also proposed.

5 Claims, 10 Drawing Figures t, RELATIVE EMISSION INSTANTS OF
SOURCES FOR EACH SHOT n
NUMBER OF SHOTS OF EACH SOURCE t, RELATIVE EMISSION INSTANTS OF SOURCES FOR EACH SHOT

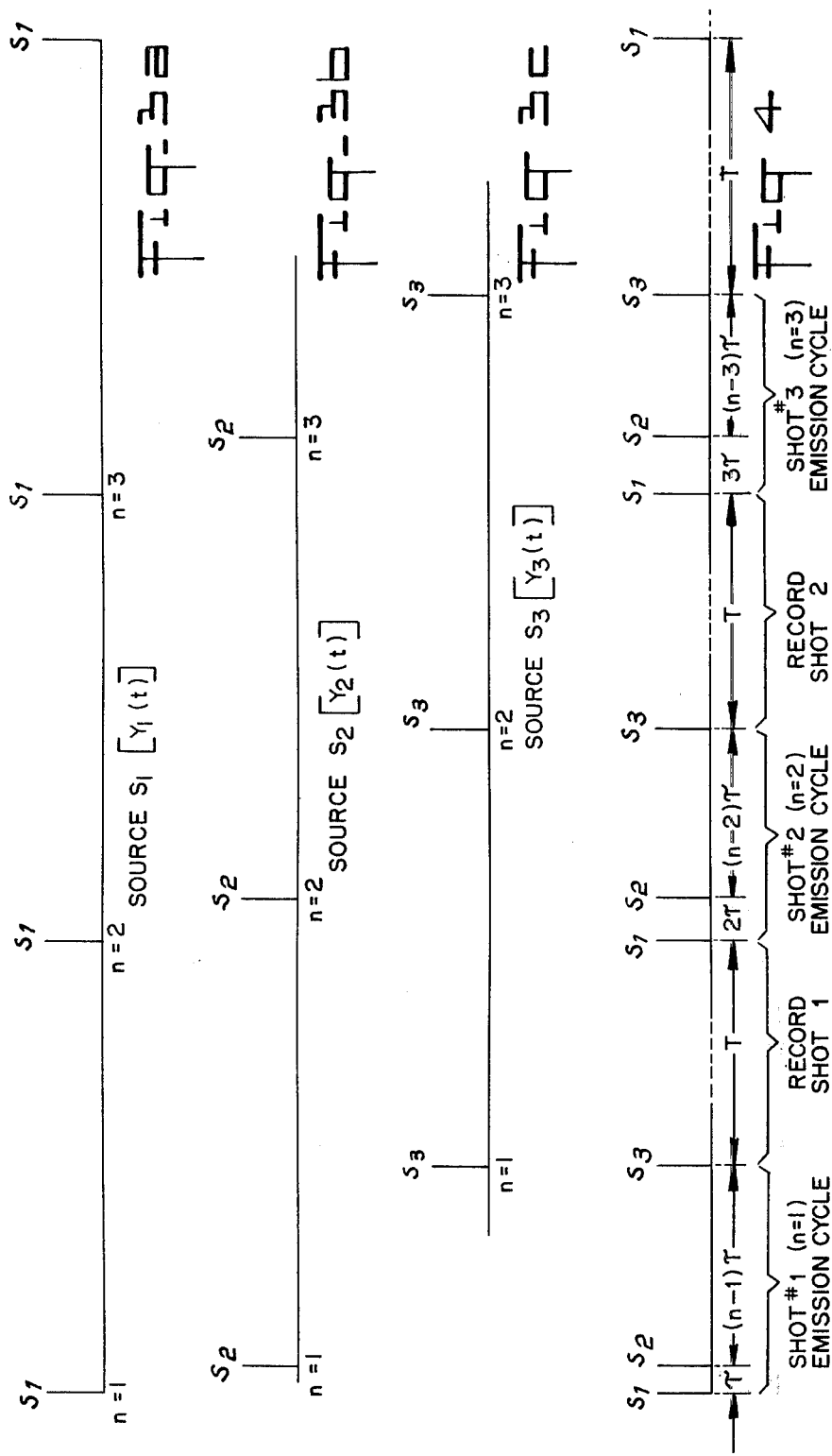

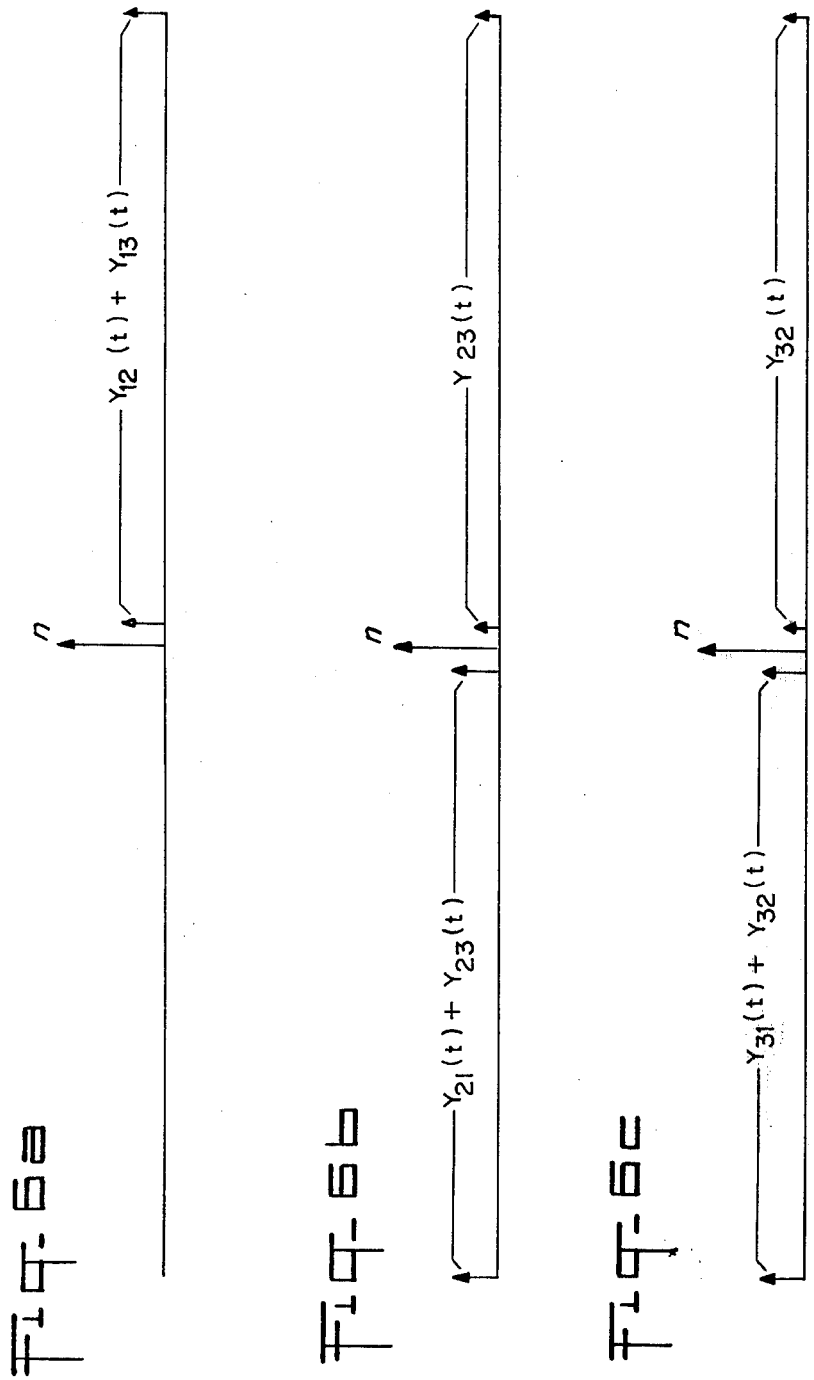

3,956,730

SEISMIC EXPLORATION

This is a continuation, of application Ser. No. 222,198, filed Jan. 31, 1972, now abandoned.

BACKGROUND OF THE INVENTION

The present invention relates to a method of exploration of a medium by the transmission of energy into this medium, in particular the geophysical prospecting of the ground medium by the creation of seismic waves permitting of the simultaneous obtaining several distinct seismic profiles of a selected geological area.

When an energy pulse is emitted from an emission point, the mechanical waves generated in the ground follow various paths, being subjected especially to reflection on reflectors which are the interfaces of geological strata of different constitutions. Appropriate pick-up transducers, such as seismographs, receive the reflected waves; these pick-ups can be grouped and distributed so as to have one or more reception points available.

Seismic prospecting of the ground makes use of emission sources which are either an explosive disposed in a tubed or untubed hole, or a source operating on the surface, such as for example, a dropping weight or the like. In the latter case it is very difficult to synchronise the sources when several of them, whether identical or not, are actuated simultaneously. Furthermore in order to obtain very precise information one must record on very close lines, and even on a crossing grid of lines. Much time is necessary to arrange the seismographs and, on the one hand, to effect the emissions and, on the other hand, to effect the recordings over all the lines of the grid, especially if it is desired to close up the meshes of the grid in order to determine the maximum information in a selected area.

In order to be able to record along several lines at the same time, the improvement as described in U.S. Pat. No: 3,506,955 (Backus and Schneider) has been proposed. This improvement consists in disposing two or three emission sources in relation to a single receiver formed by a line of seismographs and interposed between two sources, in successively emitting energy pulses with the aid of each of the sources, in receiving the reflected waves on the single receiver and in recording these reflected waves so that they can subsequently be processed and the desired data can be deduced from them. The pulses emitted by each of the sources are separated by a time interval equal at least to the maximum time T in which one is interested so that the waves created by each of the sources can never interfere during this time.

In the case where there is a large number N of sources, it follows that each of the said sources operates again only after a time NT, and that the exploration of a geological stratum of a given area necessitates the use of the apparatus for carrying out the method for a relatively long time. The price per kilometer of the section of the geological stratum prospected, which is a function of the speed of travel of the apparatus for carrying out the method, therefore becomes prohibitive.

SUMMARY OF THE INVENTION

The present invention has the purpose of reducing the major drawbacks stated above and of proposing a method of exploration which permits simultaneous utilisation of several surface sources even if they are not synchronisable, and of prospecting a large area in a relatively short measurement time.

According to a first aspect of the invention, there is provided a method of exploration of a medium comprising the steps of positioning at least two emission sources in one and the same reference plane; causing them to emit waves at different instants into the medium to be explored; picking up the waves reflected in the medium on at least one receiver; recording the instants of emission of the different emitted waves; and processing the signals received on the receiver to determine the different travel times of the reflected waves; the method including the steps of triggering the emission sources to produce respective wave emissions such as two successive wave emissions, which are separated by a time interval shorter than the outward and return travel time of the longest wave propagated in the medium to be explored, and triggering each emission source such that any two such successive wave emissions produced by the same source are separated by a time interval at least as great as the travel time of the waves propagated in the medium to be explored. The instants of emission of the emission sources are so selected and programmed that useable data can be obtained from the waves picked up by the receiver. The received reflected wave signals can be processed by correlation or stacking to obtain the same data or trace information which would be obtained by the conventional technique of triggering a source and waiting for its reflected wave before again triggering the source or triggering another source.

BRIEF DESCRIPTION OF THE DRAWINGS

The invention will now be described in greater detail, by way of example, with reference to the accompanying drawings, in which:

FIGS. 3a, 3b and 3c are diagrams of the instants of emission of the sources $S_1$, $S_2$ and $S_3$;

FIG. 4 is a diagram of the whole of the emission obtained by the sum of the diagrams in FIGS. 3a, 3b, and 3c;

FIGS. 6a, 6b and 6c represent the three cross-correlation functions of the sequence of the emission instants of each of the sources with the sequence of the emission instants of the three sources.

DESCRIPTION OF THE PREFERRED EMBODIMENTS

Figure 1:
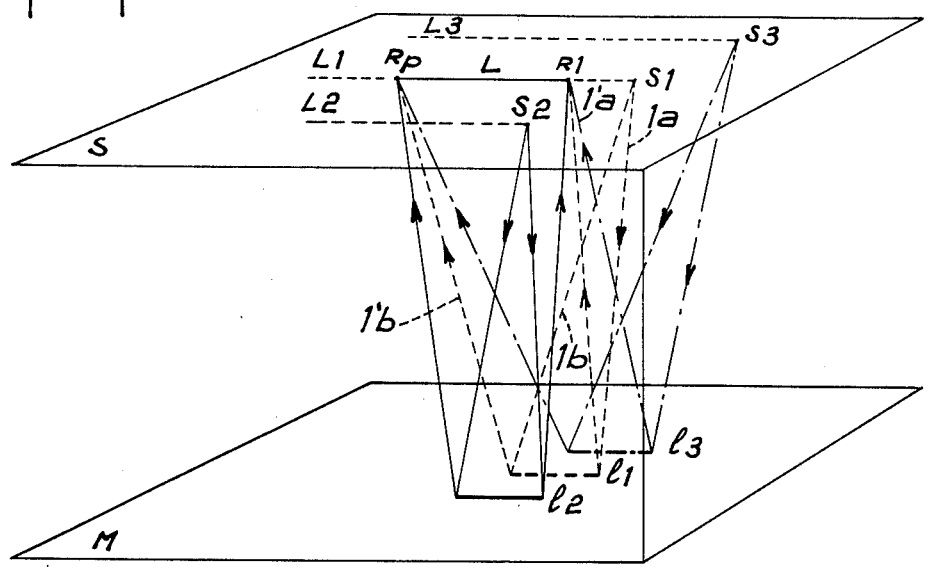
FIG. 1 is a representation of the path of the seismic rays produced by three emission sources moving in three directions and one receiver.

FIG. 1 illustrates diagrammatically an installation in which L represents the seismometer spread distributed over the ground to be prospected and formed by a certain number of seismographs or pick-up transducers $R_1, R_2, \ldots R_p$. The first emission source $S_1$ moves along a line $L_1$ identical with the line L, the pick-up transducers likewise moving at the same speed as the source $S_1$ so as to keep the distance between the said source $S_1$ and the first and nearest pick-up $R_1$ constant. The sources $S_2$ and $S_3$ are disposed in one and the same plane S defined by the line L and the source $S_1$, $S_2$ and $S_3$. The sources $S_2$ and $S_3$ preferably move respectively along the lines $L_2$ and $L_3$ each parallel with the line L, or $L_1$ in the case where these latter are identical, and are situated on a line through and to either side of the source $S_1$ at a distance which is of the order of magnitude of the distance separating the source $S_1$ from the pick-up $R_1$.

Under these circumstances, the waves issuing from the source $S_1$ are reflected on a stratum segment represented by a segment $l_1$ of a plane mirror M. The reflected wave $1'a$ detected by the pick-up $R_1$ corresponds to the incident wave $1a$ while the reflected wave $1'b$ detected by the pick-up $R_p$ corresponds to the incident wave $1b$. The same is the case for the rays issuing from the other sources $S_2$ and $S_3$ which are reflected respectively on the segments $l_2$ and $l_3$ of the plane M, the distances $l_1 - l_2$, $l_1 - l_3$ and $l_2 - l_3$, each being half of the respective distances $L_1-L_2$, $L_1-L_3$ and $L_2-L_3$.

The method according to the invention allows one to distinguish the information due to $L_1$, $L_2$ or $L_3$. For this purpose reference will be made to FIG. 2, which represents an example of the emission cycle of the three sources $S_1$, $S_2$ and $S_3$ as a function of time.

It is supposed that each source $S_1$, $S_2$ or $S_3$ generates a pulse every T seconds, T being the maximum recording time in which one is interested, or in other words the outward and return travel time of the longest wave propagated in the medium to be explored. In land seismics, T is, for example, of the order of 5 to 6 seconds.

Thus, between the last instant of emission of a horizontal line of the diagram of the emission cycle and the first instant of emission of the following horizontal line, there is a time interval at least equal to T seconds.

Figure 2:
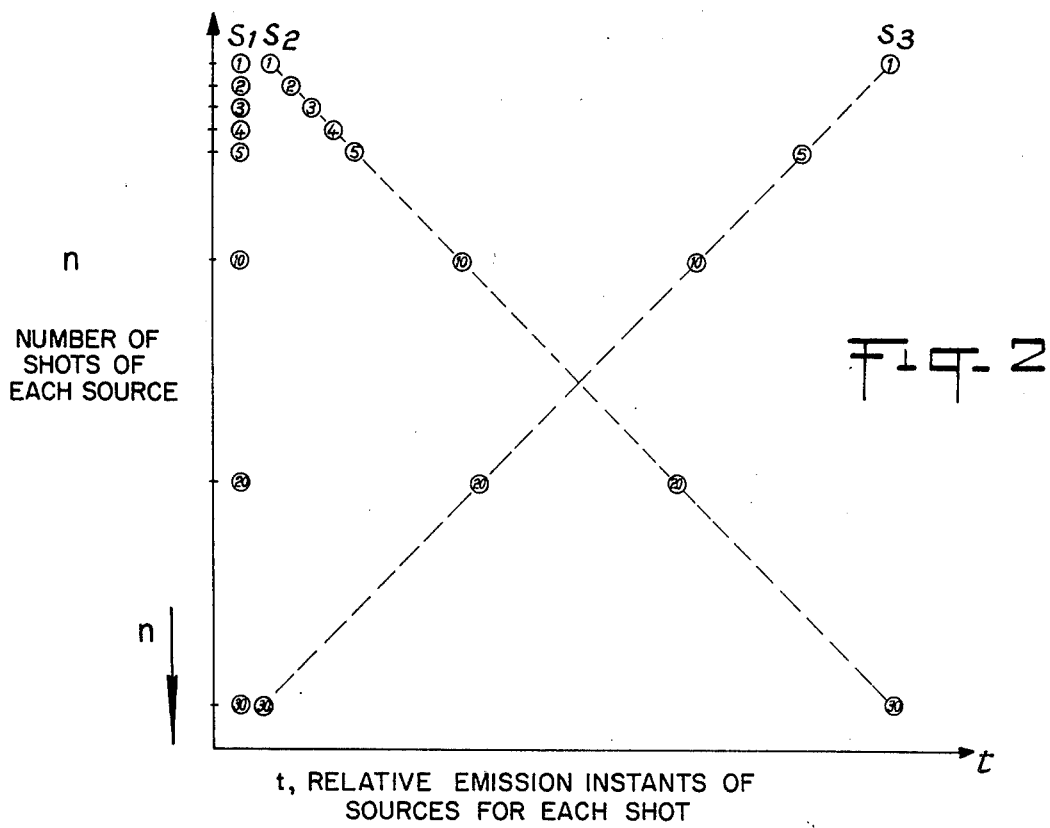
FIG. 2 is a representation of the emission cycle of each of the three sources as a function of time.

At zero instant the source $S_1$ emits a pulse and the instant of emission of the said pulse is recorded. An instant later, for example $\tau$ second, later the second source $S_2$ in turn emits a pulse, the emission instant of which is likewise recorded. The third source $S_3$ emits a pulse $(n-1)\tau$ second after the emission of the second source $S_2$, (where $n$ is the predetermined number of emissions or shots of each source, for example, $n=30$ as shown at FIG. 2) the instant of emission of the source $S_3$ again being recorded. Thus, this first recording must have a duration at least to $n\tau$ increased by the time T, this duration being that of a recording cycle.

The second recording cycle commences with the second emission of the first source $S_1$. The second source $S_2$ emits a pulse $2\tau$ second after the second emission of the source $S_1$, while the third source emits a pulse $(n-2)\tau$ second after the second source $S_2$. This continues until the nth emission of the first source $S_1$, which is immediately followed by the emission of the third source $S_3$, and, $(n-1)\tau$ second after, by the emission of the second source $S_2$. The total duration of the emission is equal at minimum to the sum of the time intervals between the emissions of the first source, namely:

$$T' = 2(T + n\tau) + 2[T + (n-1)\tau] + 2[T + (n-2)\tau]$$
$$+ \ldots + 2\left[T + \frac{n}{2}\tau\right].$$

that is $T' = nT + 2T + 3\frac{n}{2} \times \left(\frac{n}{2} + 1\right)\tau$.

In a practical example of the methods as described above, the source $S_1$ emits thirty pulses, that is $n = 30$; with $\tau = 4 \times 10^{-3}$ secs and T = 6 secs using a single source, as in the prior art. In relation to the normal duration, which would be $30 \times 6 = 180$ secs, one finds an increase of about 15 secs, that is only about 10% of the total time to obtain data from three sources.

The above description of the emissions cycles shows that the emission has been realised during the time $T'$, but of course the recording could be stopped a time T after the appearance by transmitted radio wave of the third pulse of each emission cycle, which stoppage may be as long as desired. In fact this raises no particular problems in treatment since all the emission instants are recorded on one or more reference traces. If all these reference pulses are recorded on one and the same trace, arrangement is made to distinguish, in the data processing, those which relate to the source $S_1$ from those which relate to the source $S_2$ and those which relate to the source $S_3$. Sources $S_1$, $S_2$, and $S_3$ have a rank or sequence 1, 2, and 3 respectively for the $n/2$ first recording cycles, as shown for shots 1 through 15 of FIG. 2, where $n$, the number of shots, is 30. The sources have a rank $S_1$, $S_3$, $S_2$ for the $n/2$ second recording cycles, as shown for shots 16 through 30 of FIG. 2.

Thus by virtue of the recording of the reference instants relating to each of the sources it is possible to process the land recording by successively favouring the energy due to the source $S_1$, then to the source $S_2$ and finally to the source $S_3$.

FIGS. 3a, 3b and 3c represent the diagrams of the emission instants for each of the sources $S_1$, $S_2$ and $S_3$. Between each of the emission instants of one and the same line, a time elapses at least equal to the time T, that is to say, at least equal to the maximum recording time in which one is interested. Thus it is seen that the sources $S_1$, $S_2$ and $S_3$ emit simultaneously in the sense that the emissions of the sources $S_2$ and $S_3$ are produced while the acoustic waves engendered by the source $S_1$ have not yet reached the receiver or receivers. However it should be noted that the said emissions of the sources $S_1$, $S_2$ and $S_3$ are not synchronous, since they are staggered in relation to one another in accordance with a preselected emission program. As shown at FIG. 4, (which is a graphical addition of FIGS. 3a, 3b and 3c) the time interval between $S_1$ and $S_2$ for emission cycle No. 1 is different from the time interval between $S_1$ and $S_2$ for emission cycle No. 2. (In emission cycle No. 2 the time interval between $S_1$ and $S_2$ is greater). In the case of emission cycle No. 3 the time interval between $S_1$ and $S_2$ is greater than either emission cycle No. 1 or emission cycle No. 2. Similarly, the time interval between $S_2$ and $S_3$ for emission cycle No. 1 is greater than the time interval between $S_2$ and $S_3$ for emission cycle No. 2, and the time interval between $S_2$ and $S_3$ for emission cycle No. 3 is even smaller than that of the emission cycle No. 2.

FIG. 4 represents the first three shots of program of the whole of the emission in the case where the latter has been realised continuously, that is to say without a halt between each emission cycle, the receiver or receivers simultaneously recording the acoustic waves produced by $S_1$, $S_2$ and $S_3$ and reflected by the segments $l_1$, $l_2$ and $l_3$.

To distinguish the date corresponding to the segment $l_1$, the signals received and recorded are cross-correlated with the sequence of the emission instants of the source $S_1$; the same is done for each of the sources $S_2$ and $S_3$.

The emission programme or code is preselected and defined so that any one of the cross-correlation functions of the emission instants of all the sources with the sequence of the emission instants of at least one of the said sources presents, within the time T, a ratio of the amplitude of the maximum peak to the amplitude of each secondary residue which is greater than the ratio of the amplitudes of the signals received in the time intervals corresponding to the given time intervals separating the maximum peak from each of the secondary residues.

If the function representing the emission code of the source $S_1$ is called $y_1(t)$, the function representing the emission code of the source $S_2$ is called $y_2(t)$ and the function representing the emission code of the source $S_3$ is called $y_3(t)$, and the functions sought corresponding to the seismic recordings obtained when an emission is effected at the ground surface respectively with the sources $S_1$, $S_2$ and $S_3$ are called $f_1(t), f_2(t)$ and $f_3(t)$, it is seen that FIG. 4 represents $y_1(t) + y_2(t) + y_3(t)$ while what was received by the receiver device after travel through the medium or devices can be written: $[y_1(t)* f_1(t)] + [y_2(t)* f_2(t)] + [y_3(t)* f_3(t)]$ (the symbol * signifies convoluted by)
Thus it is clear that the data corresponding to each of the sources are mixed in the course of recording.

If one cross-correlates over the period T what is received by the receiver with one of the emission functions or emission codes defined above, the final result can be written, in the case of cross-correlation of the received signals with $y_1(t)$: $[y_{11}(t)* f_1(t)] + [y_{12}(t)* f_2(t)] + [y_{13}(t)* f_3(t)]$
where $Y_{11}(t)$ is the autocorrelation function of $y_1(t)$ which reduces to the product of the unit function by the number of pulses n emitted by the source $S_1$; $Y_{12}(t)$ is the cross-correlation function of $y_1(t)$ with $y_2(t)$; $Y_{13}(t)$ is the cross-correlation function of $y_1(t)$ with $y_3(t)$.

The final result is physically identical with that which would have been obtained if the source $S_1$ had acted alone, to the extent that the amplitudes of the residues $Y_{12}(t)$ and $Y_{13}(t)$ are small in comparison with $n$.

One operates so that the ratio of the amplitude of the maximum peak of $Y_{11}(t)$ (equal to n) to the sum of the amplitudes of the secondary residues $Y_{12}(t) + Y_{13}(t)$ is greater than the ratio of the amplitudes of the signals received in the time intervals corresponding to the given time intervals separating $Y_{11}(t)$ from each of the said secondary residues $Y_{12}(t)$ and $Y_{13}(t)$. Thus, this allows a determination of the function $f_1(t)$ which is sought, without impediment by the secondary terms $[Y_{12}(t)* f_2(t)] + [Y_{13}(t)* f_3(t)]$ In the same way as above, to determine the final result which would be physically identical with that which would have been obtained if the sources $S_2$ or $S_3$ had acted alone, the following relationship will be sought: $[Y_{22}(t) * f_2(t)] + [Y_{23}(t) * f_3(t)] + [Y_{21}(t) * f_1(t)]$ $[Y_{33}(t) * f_3(t)] + [Y_{31}(t) * f_1(t)] + [Y_{32}(t) * f_2(t)]$
in which $Y_{22}(t)$ and $Y_{33}(t)$ are respectively the autocorrelation functions of $y_2(t)$ and $y_3(t)$ and the terms $Y_{23}(t), Y_{31}(t)$ are the secondary residues for each of the functions under consideration.

In FIGS. 6a, 6b and 6c there are represented the three cross-correlation functions. As may be seen, the cross-correlation function represented in FIG. 6a is formed by the autocorrelation function $Y_{11}(t)$ (equal in amplitude to $n$) adjacent adjacent on one side to the representation of the sum of the amplitudes of the secondary residues $Y_{12}(t)$ and $Y_{13}(t)$. The secondary residues $Y_{12}(t)$ and $Y_{13}(t)$ are on one side only of $Y_{11}(t)$ because the emissions from sources $S_2$ and $S_3$ alway occur after the emission from source $S_1$.

The cross-correlation function represented in FIG. 6b is formed by the autocorrelation function of $y_2(t)$ which is $Y_{22}(t)$ (of amplitude $n$) adjacent to a representation of by the sum of the amplitudes of the secondary residues $Y_{21}(t)$ and $Y_{23}(t)$. The secondary residue $Y_{21}(t)$ from source $S_1$ precedes $Y_{22}(t)$ because $S_1$ always emits before $S_2$, whereas $Y_{23}(t)$ appears on both sides of $Y_{22}(t)$ because $S_3$ emits after $S_2$ during the first 15 shots, but before $S_2$ during the last 15 shots, where there are 30 shots.

In FIG. 6c it is seen that the autocorrelation function of $y_3(t)$ of which is $Y_{33}(t)$ (of amplitude n) is adjacent on either side the the secondary residues $Y_{31}(t)$ and $Y_{32}(t)$.

In each instance in FIGS. 6a–6c, the resulting correlation function represented by n has an amplitude quite large with respect to the amplitude of the secondary residues.

Where only a single source such as source $S_1$ was used in the past, it was the practice to correlate the received and recorded wave from this single source by the well known technique of stacking or aligning the received waves with respect to the instants of emission of the source. Similarly, the auto-correlation function $Y_{11}(t)$ merely indicates that physically, the recorded waves or traces from each emission cycle are stacked with respect to the instants of emission of the source $S_1$ in order to obtain the $Y_{11}(t)$ function of FIG. 6a. Similarly, the auto-correlation function $Y_{22}(t)$ of FIG. 6b is obtained by stacking the recorded traces with respect to the respective instants of emission of source $S_2$. Likewise, to obtain the auto-correlation function $Y_{33}(t)$ of FIG. 6c, the traces are stacked with respect to the respective instants of emission of source $S_3$. By virtue of the emission code timing shown generally at FIG. 2, such stacking or correlation results in essential alignment of the received waves to provide the auto-correlation amplitude $n$ with the secondary residues spread out so they do not add during stacking and hence, are of relatively low amplitude compared with the amplitude of $n$.

In the description given above, reference was made to a line of receivers and to three sources which are disposed on either side of the receiver either on one and the same level, as is the case in marine seismics, or at different levels in land seismics, the data then being processed to bring them into one reference plane.

Figure 5:
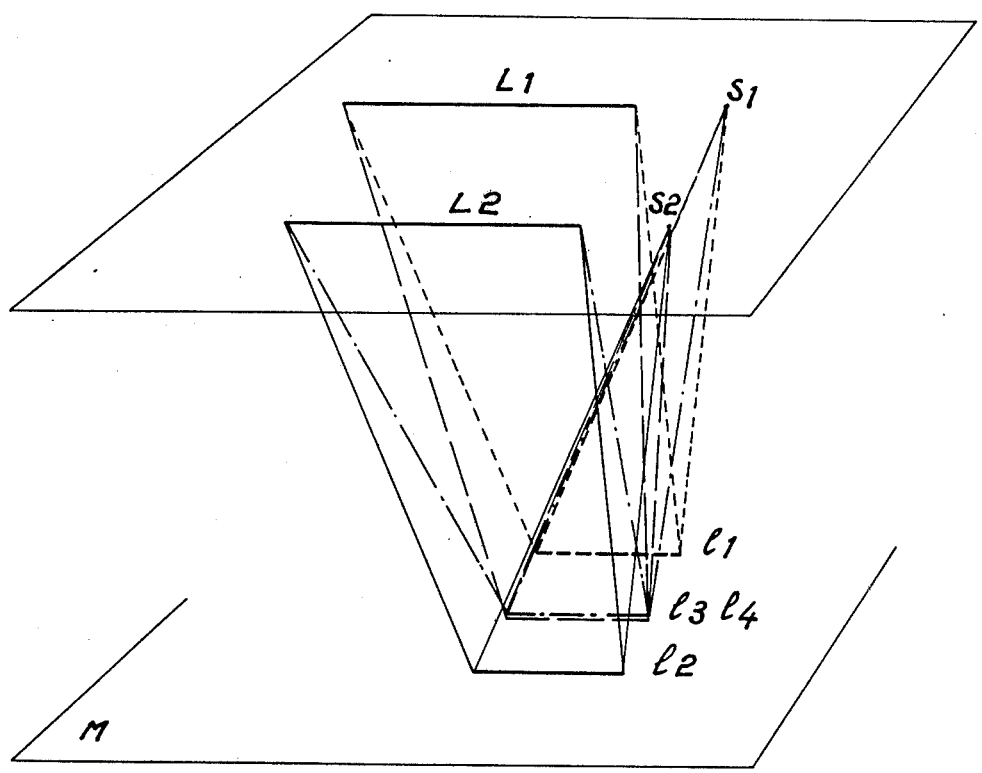
FIG. 5 is a representation of the paths of the seismic wave recorded after reflection on two receivers.

It is equally possible to utilise several lines of receivers so that it is possible to multiply the seismic paths in all directions. In FIG. 5 there is shown, in order not to overload the drawing unnecessarily, the case of two sources $S_1$ and $S_2$ and of two lines of receivers $L_1$ and $L_2$. The segment $l_1$ corresponds to the emission of the source $S_1$ as registered by receivers along $L_1$, while the segment $l_2$ corresponds to the emission of the source $S_2$ as registered by receivers along $L_2$. The two other reflector segments $l_3$ and $l_4$ are merged but obtained by different acoustic wave paths, $l_3$ being the reflector of the waves emitted by the source $S_1$ and registered by the line of receivers $L_2$, and $l_4$ being the reflector of the waves emitted by the source $S_2$ and registered by the line of receivers $L_1$.

One advantage of this method consists in the fact that it is possible simultaneously to use several sources which are difficult or impossible to synchronise and at least one receiver, and to obtain, without supplementary recording time, information deriving from different reflection points. Moreover, the method permits easy separation of such information coming from different reflecting points and recorded simultaneously, and thus precise determination of the reflectors so detected.

Thus, this method is of interest whenever sources which are difficult and/or impossible to synchronise are available, and/or it is desired to obtain distinct depth information in a minimum of time and with a minimum of equipment.

It will be understood that the above description of the present invention is susceptible to various modification changes and adaptations.

I claim:

1. A method of exploration of a medium comprising the steps of:

providing first and second emission sources in a reference plane;

during a first emission cycle causing said first source to emit a wave into a medium at a first instant, and causing said second source to emit a wave into a medium at a second instant different from and after the first instant;

said first and second instants being separated by a time interval shorter than the outward and return, that is to say, the round-trip travel time of the longest wave from said sources propagated in the medium to be explored;

during a second emission cycle causing one of said sources to emit another wave into the medium at a first instant separated from said second instant of the first cycle by a time period at least as great as the round-trip travel time of the wave emitted at said second instant of the first cycle, and causing another source to emit another wave into the medium at a second instant after the first instant of the second cycle;

said first and second instants of the second cycle being separated by a time interval less than the round-trip travel time of the wave emitted at the second instant of the first cycle, and the time interval between the first and second instants of the second cycle being different from the time interval between the first and second instants of the first cycle;

recording the instant of each such emission of each source;

picking up on a receiver, the waves reflected in the medium as a result of each such emission; and processing the signals on the receiver to determine the travel times of the reflected waves from each source.

2. A method of exploration according to claim 1 further comprising:

during a series of additional cycles, causing said first and second sources to emit additional waves at additional first and second instants, with the time interval between said first and second instants of a cycle being different from the time intervals of any preceding cycle, and with the time period between a second instant of one cycle and a first instant of an immediately following next cycle being greater than said round-trip travel time.

3. A method of exploration according to claim 1 which further includes the steps of:

providing a third emission source;

causing said third emission source to emit a wave into the medium, during each cycle, at a third instant different from said first and second instants;

the greatest time interval between the first and second, or the first and third instants of each cycle being less than said round-trip travel time, and the time period between a last emission instant of one cycle and a first instant of an immediately following next cycle being greater than said round-trip travel time.

4. A method according to claim 3 wherein, the method further includes:

positioning said sources and receiver with the distance between said first source and receiver equal to the distance between the first and second sources, and equal to the distance between the first and third sources.

5. A method according to claim 1 wherein the method further includes:

providing several emission sources;

providing several receivers;

causing emission of waves from each of the sources for reflection by different strata of the medium; and recording the reflected waves on each of the receivers.

* * * * *